US006876863B1

(12) United States Patent
Schroeder et al.

(10) Patent No.: US 6,876,863 B1
(45) Date of Patent: Apr. 5, 2005

(54) SYSTEM FOR PROTECTING AMPS DATA USING CDPD CHANNEL

(75) Inventors: Martin K. Schroeder, San Diego, CA (US); Yorgos M. Peponides, Encinitas, CA (US); Michael L. Lubin, Delmar, CA (US)

(73) Assignee: Cirrus Logic, Inc., Austin, TX (US)

( * ) Notice: Subject to any disclaimer, the term of this patent is extended or adjusted under 35 U.S.C. 154(b) by 181 days.

(21) Appl. No.: 10/175,568

(22) Filed: Jun. 18, 2002

Related U.S. Application Data (60) Division of application No. 08/481,627, filed on Jun. 7, 1995, now Pat. No. 6,463,271, and a continuation-in-part of application No. 08/117,913, filed on Sep. 8, 1993, now abandoned.

(51) Int. Cl.[7] .......................... H04Q 7/20; H04M 1/00; H04B 1/38; H04B 17/00
(52) U.S. Cl. ................. 455/466; 455/67.11; 455/432.1; 455/461; 455/553.1; 455/561
(58) Field of Search ................................ 455/466, 461, 455/553.1, 67.11, 432.1, 561, 436

(56) References Cited

U.S. PATENT DOCUMENTS

| | | | | |
|---|---|---|---|---|
| 5,805,997 A | * | 9/1998 | Farris .......................... | 455/461 |
| 5,819,184 A | * | 10/1998 | Cashman .................. | 455/553.1 |
| 5,920,821 A | * | 7/1999 | Seazholtz et al. ........... | 455/466 |
| 6,052,565 A | * | 4/2000 | Ishikura et al. .......... | 455/67.11 |
| 6,128,489 A | * | 10/2000 | Seazholtz et al. ......... | 455/432.1 |
| 6,157,836 A | * | 12/2000 | Cashman ..................... | 455/436 |
| 6,246,875 B1 | * | 6/2001 | Seazholtz et al. ......... | 455/432.1 |
| 6,334,062 B1 | * | 12/2001 | Cashman .................. | 455/553.1 |
| 6,449,494 B1 | * | 9/2002 | Cashman .................. | 455/553.1 |
| 6,463,271 B1 | * | 10/2002 | Schroeder et al. .......... | 455/561 |

FOREIGN PATENT DOCUMENTS

| | | | |
|---|---|---|---|
| EP | 0849963 | * | 6/1998 |
| WO | WO 95/07595 | * | 3/1995 |

OTHER PUBLICATIONS

Cellular Digital Packet Data System Specification, Version 1.0, Aug. 1993.*
Taylor, Waung, and Banan, "Internetwork Mobility, The CDPD Approach" Jun. 11, 1996, Pearson Education, Incorporated.*
Lucent Technologies, "Lucent technologies announces software upgrade to CDPD system" Feb. 13, 1996.*
AT&T, "AT&T CDPD wireless data equipment now available" Sep. 14, 1994.*
AT&T, "AT&T adds CDPD system to protfolio of wireless data products" Aug. 23, 1993.*
Wireless Week, "Verizon Puts End Time ON CDPD" May 15, 2003.*

* cited by examiner

*Primary Examiner*—William D. Cumming
(74) *Attorney, Agent, or Firm*—Thompson & Knight LLP; James J. Murphy (57) ABSTRACT

A portable radio telephone handset includes the capability of operating as a data transfer terminal as well as an analog cellular telephone subscriber station. Two modes of operation are available in the handset, an analog cellular communication mode and a Cellular Digital Packet Data (CDPD) mode. A paging function for incoming analog cellular communication is carried out on a CDPD channel. The handset distinguishes between paging signals identifying CDPD mode communications and paging signals identifying analog cellular communications. The handset automatically preempts CDPD communications in favor of analog cellular communications such as those carried out in an AMPS configuration. To maintain the security of the handset ID, AMPS communications can be set up and controlled using CDPD control channels.

8 Claims, 5 Drawing Sheets

SYSTEM FOR PROTECTING AMPS DATA USING CDPD CHANNEL

This is a continuation-in-part application of Ser. No. 08/117,913 filed Sep. 8, 1993; and a divisional application of parent application U.S. Ser. No. 08/481,627, filed Jun. 7, 1995 by inventor Schroeder, entitled "A PORTABLE RADIO TELEPHONE DATA TERMINAL USING CDPD" currently pending.

TECHNICAL FIELD

This invention relates generally to wireless communication devices. More particularly, the invention relates to wireless portable phones supporting transmission and reception of data, fax, and voice signals.

BACKGROUND ART

Mobile wireless communication of analog voice signals was initially carried by half duplex radio systems. Citizens Band radio, one type of mobile wireless radio, uses amplitude modulation (AM) upon a carrier frequency to transmit or receive voice signals in a half duplex manner. Other mobile wireless radios used frequency modulation (FM) within a given carrier frequency range in order to transmit or receive voice signals, half duplex, achieving improved noise characteristics. These mobile wireless radios allowed a user to move within a given radius of antennas. A disadvantage to these systems was that once a user was beyond a certain range of a given base antenna, the radio channel for a given carrier frequency was inoperative. Another disadvantage was that wireless half duplex voice communication was unacceptable to most consumers. The consumer wanted a wireless duplex voice communication system similar to his or her wired home telephone.

In the 1980's, mobile wireless duplex voice communication was introduced into the marketplace by using an analog FM based cellular radio. This analog cellular system for mobile wireless duplex voice transmission was called "Advanced Mobile Phone Service" (AMPS). Introduced by AT&T, the AMPS cellular network uses the FCC assigned carrier frequency range of 800 to 900 MHz. AMPS automobile cellular units were first permanently attached to the user's car. Automobile cellular units transmitted voice signals to a cellular base station within a given cell using one watt of power. Hand-held cellular units using battery power supplies were later introduced and transmitted voice signals to a cellular base station within a given cell using one quarter watt of transmit power. Because hand held cellular units operated from a battery power supply, the power consumed by the cellular phones became critical.

When a cellular phone is powered up and waiting to receive a phone call, it is in a stand-by mode consuming less power than in an active mode. However, when the hand held unit is in a stand-by mode, it constantly listens for its registration number in order to become active and receive a phone call. The stand-by mode, although lower in power than the active communication mode, continuously uses a considerable amount of power. It is desirable to further decrease the amount of power used in the stand-by mode in order to further increase the time the cellular unit requires for recharging or replacing batteries.

The human analog voice was the initial signal that the AMPS system was designed to communicate. The AMPS system was optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of antennas whereby a user's signal is handed off to the next cell site as he moves into a different cell area. This cellular handoff can cause a temporary loss in transmission or reception. However, temporarily losing a voice signal is not critical because a user knows when there is a signal loss and can retransmit the voice information. However, signal loss, even though temporary, poses special problems for transmission of digital data. Some other AMPS mobile cellular problems causing a loss in a voice signal are fading signal strength, reflections, Rayleigh fading, and cellular dead spots.

The availability of portable computers naturally led to the desire to transmit digital data via wireless from a remote location. Presently, the AMPS voice cellular system is being used to transmit digital data in the form of Circuit Switched Cellular Data across AMPS carrier channels. Raw (baseband) digital data is converted so that it can be transmitted and received across the analog AMPS system. One disadvantage to using the AMPS system is that a narrow channel bandwidth and errors in transmission limits the baud rate of transmitting and receiving digital data. Another disadvantage of using AMPS to communicate digital data is that movement of the subscriber unit may cause a cellular handoff to occur, thus causing a loss of the digitally transmitted or received information. Loss of digital data may corrupt a data file such that it is useless. Other losses of the raw digital data may be caused by other problems of the AMPS mobile cellular system.

Another wireless communication device is a pager. Most pagers use simplex or one way communication receiving only a limited amount of information such as a telephone number. Most pagers only display information to a user on demand and perform no other function. Because only one way communication is required, an acknowledgement is not returned by the pager to the original sender. In many cases it is desirable that a sending party receive an acknowledgement minimally, telling him that his page message was received. In some cases it may be appropriate to respond by leaving a return page message. A disadvantage of present paging systems is that acknowledgment and return pages are not widely available because simplex paging is more commercialized than other paging modes. Another disadvantage of present pagers is that a displayed telephone number is not automatically and electronically dialed directly on a telephone. A user reads the telephone number from a pager's display and manually dials the number on a telephone in order to contact the paging party. It is desirable that a wireless pager have the capability of automatically dialing a received telephone number on a wireless cellular telephone via electronic means, thus integrating the features of a wireless cellular telephone with that of a duplex pager.

A wired product that is presently popular is high speed fax-modems. Fax-modem hardware and firmware in conjunction with fax and data communication application software have the capability of sending digital data over various modem protocols as well as sending facsimile data by using the various facsimile protocols. Fax or data communication application software may operate on different hardware such as home or portable computer, personal communicator, personal digital assistant, or other electronic devices. Examples of modem protocols for standard modulated data are CCITT V. 22bis, CCITT V. 23, CCITT V.32, Bell103, and Bell212A. Modem protocols that include error control include CCITT V.42, MNP2, MNP3, MNP4, and MNP10. Modem protocols that provide data compression are CCITT V. 42bis and MNP5. Facsimile protocols include CCITT V.21, CCITT V.27ter, CCITT V.29, CCITT T.4, CCITT T.30, CCITT T.35, Class I-EIA/TIA 578, Class I-EIA 592, and Class II-EIA 578-SP2188. A fax-modem accepts raw (baseband) digital data from an electronic device over an internal data bus or external RS-232 port. Raw digital data is converted and modulated into data of a given protocol for transmission onto a standard telephone line. Data received from the telephone line can be converted from the modulated form into raw digital data that can be interpreted by the hardware, firmware and application software.

A disadvantage of present fax-modems is that most require a wire connection to a telephone line. Present methods of providing wireless capability for a fax-modem take the modulated analog modem output signal from a fax-modem and input this into an AMPS conversion unit. The AMPS conversion unit converts and modulates the transmitted analog modem output signal into a different analog form for transmission onto the AMPS network The analog modem output signal is converted into what is called Circuit Switched Cellular Data. Received AMPS signals can be converted from Circuit Switched Cellular Data by the AMPS conversion unit into analog modem input signals that the fax-modem can receive. Presently, fax-modems do not directly convert and modulate raw digital data into an analog signal for transmission onto the AMPS cellular network. A disadvantage to present methods of providing wireless fax-modem capability is that it requires additional devices to send or receive fax and digital data over the AMPS cellular network. Another disadvantage is that more power is necessary for additional components, such as the AMPS conversion unit. Another disadvantage is that a user must carry the portable computer, fax-modem, and AMPS conversion unit to provide wireless fax-modem capability. It is desirable to incorporate a fax-modem and AMPS conversion unit into one unit providing the capability of sending Circuit Switched Cellular Data across the AMPS network.

A disadvantage to using Circuit Switched Cellular Data communication across AMPS is that it requires that the mobile unit be stationary to avoid losing data from fading or cellular handoff associated with a non-stationary mobile AMPS communication. Thus, a mobile unit should avoid being moved even slightly when performing communication of Circuit Switched Cellular Data using the AMPS network.

Heretofore, providing efficient wireless transmission of both voice and data signals into one small hand held integrated package has been difficult. Furthermore, it is difficult to integrate the features of AMPS voice transmission with applications such as data transmission, electronic mail, duplex paging and provide a Circuit Switched Cellular Data interface such as a wireless fax-modem into a single hand held battery operated wireless unit. Further, the integration of these features into a single hand held unit has not been possible because of the unavailability of the underlying electronic components and application software required to integrate all these features into a single hand held unit. It is desirable to integrate AMPS voice communication and a data communication mode when moving between cell sites, as well as providing the capability of providing Circuit Switched Cellular Data Communication into one integrated hand-held unit.

DISCLOSURE OF THE INVENTION

An object of the present invention is to combine the capabilities of a voice cellular telephone, pager, and wireless fax-modem into one integrated battery operated hand held unit.

A further object of the present invention is to reduce the standby power consumption of a cellular telephone such that continuous operating capacity of the battery of a cellular telephone is increased.

Another object of the present invention is to achieve mobility in the transmission of digital and facsimile information without incurring errors.

Still a further object of the present invention is to protect identity data of mobile stations during the set-up of AMPS communications.

Yet another object of the present invention is to encrypt portions of AMPS communications.

An additional object of the present invention is the facilitation of data exchange between AMPS communications systems and CDPD communication systems.

The aforementioned objects are carried out using a portable radio telephone data terminal comprising means for controlling Cellular Digital Packet Data (CDPD) communication by use of CDPD control channels and the means for controlling analog cellular communications by use of CDPD control channels. The data terminal also includes means for selecting operation of one or the other of the two controlling means. This arrangement operates to set up AMPS communications using the CDPD control channels which are encrypted. As a result, handset or end user identification data which is exchanged in setting up AMPS communications are encrypted, and cannot be intercepted and decoded as is possible with normal AMPS communication.

The aforementioned handset is part of a method for setting up analog cellular calls in an AMPS system in order to maintain the security of an identity number associated with the mobile station. The AMPS system must be associated with a CDPD system 80 that scanning for a CDPD control signal and identifying a CDPD control channel is possible. Once this is done, the identity of the mobile station is sent to the CDPD base station over the CDPD control channel. This identity number includes AMPS information associated with that mobile station which is used for setting up the AMPS call. Finally, the AMPS data associated with the mobile station is sent from the CDPD base station to an AMPS base station. From this point, additional instructions can be sent to the mobile station using either the AMPS communication system or the CDPD communication system.

Another embodiment of the present invention is directed to a comprehensive communication system including an AMPS portion and a CDPD portion. Each of these portions is constituted by a plurality of base stations to carry out communications with a plurality of portable radio telephone devices. Each type of base station is controlled by a respective type of switching office. Each of the switching offices is connected to an external communication network. The key improvement of the inventive system is that means for exchanging AMPS data between a CDPD base station and one of the mobile radio telephone stations over CDPD control channel exists for the purpose of setting up AMPS communications.

BEST MODE FOR CARRYING OUT THE INVENTION

One solution to the aforementioned difficulties of integrating portable voice and data communications resides in a new digital wireless communication technology developed to overcome some of the undesirable effects of transmitting raw digital data over the AMPS system. This new digital wireless communication system and network is called Cellular Digital Packet Data (CDPD). The CDPD communication system shares the same carrier frequencies assigned to the AMPS channels as indicated in Appendix I, and adheres to the standards specified in Appendix VII. A base unit, mobile data base station (MDBS), of the CDPD system utilizes an unused channel within an AMPS cell to establish a link and communicate to a user's mobile end system. The mobile end system is a portable computer or other portable electronic device containing a subscriber unit. An MDBS then communicates from the user across a service provider's network of wire lines, microwave links, satellite links, AMPS cellular links, or other CDPD links in order to transmit data to another mobile end system, computer network, or other non-mobile electronic system. Within a cell area the MDBS first performs "RF sniffing" in order to detect an unused AMPS channel. CDPD use of an AMPS channel is limited to the idle time between AMPS channel access. If an AMPS cellular unit begins transmitting on a channel occupied by CDPD, the CDPD unit ceases transmitting on that channel and waits until the same channel becomes available or switches, referred to as channel hopping, to a different available channel.

Within the CDPD network, digital data is burst mode transmitted between a given subscriber unit (SU) within a mobile system and a mobile data base station (MDBS) using Gaussian Minimum Shift Keying (GMSK) modulation. Communicating in a burst mode fashion reduces the time that an SU communicates with an MDBS such that other SUs can talk with the same MDBS. For a given data size, the CDPD connect time is reduced considerably when compared to sending digital data over the AMPS network. Presently the raw (baseband) digital data envisioned being transferred across CDPD are electronic mail messages, digital fax data, or digital data representing a network connection such that files may be transferred as if currently connected to a local area network. Other CDPD applications are being developed such as CDPD duplex paging.

The CDPD subscriber unit was designed to be inserted into a given computer displacing the floppy disk drive. The subscriber unit interfaces to the computer's internal data bus such that data can be transmitted or received across the CDPD network. In this manner electronic mail, electronic faxes, and data files can be sent without use of a landline system. However, it may be not economical to transfer large digital data files using the wireless CDPD network. In this case using a standard data modem connected to the wired telephone system may be preferred.

A disadvantage of present portable computers is that many are still too large and heavy for continuous use by a majority of consumers, especially with cellular handsets. Furthermore, many consumers do not require the computing power contained in a portable computer nor desire to pay for such expense just to utilize the CDPD network. However, the consumer may still desire to send a limited amount of digital information through a wireless system such as the CDPD network. In other cases it may be desirable to share a subscriber unit amongst company employees such that only the employee on travel requires the subscriber unit.

Interchanging a CDPD subscriber unit from one persons portable computer to another's portable computer is difficult. It is preferable that a user be able to easily interface a portable computer or other electronic device to a form of CDPD subscriber unit for communication across the CDPD network.

Figure 1:
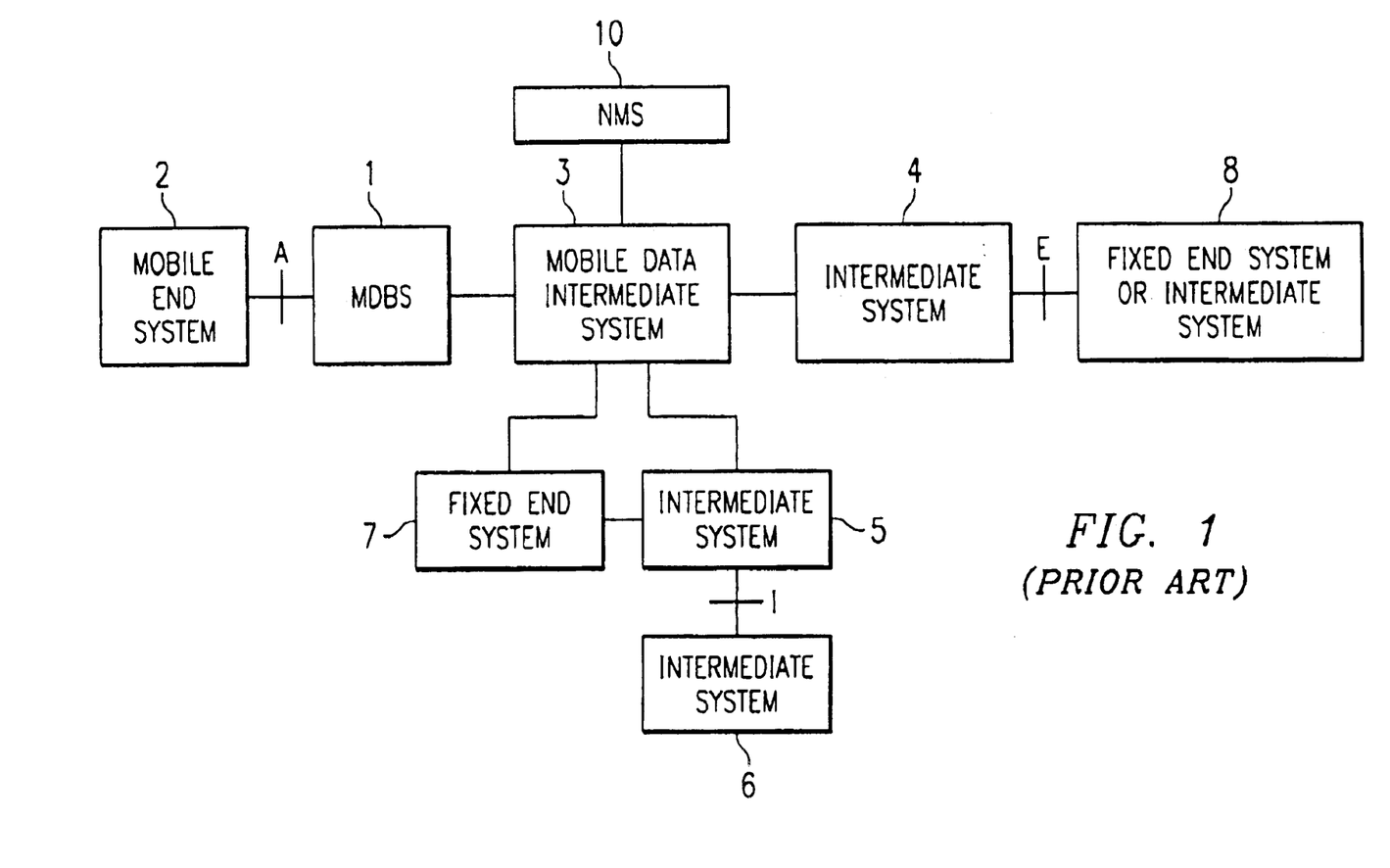
FIG. 1 is a block diagram of a portable radio telephone handset participating in communications system of the present invention.

Integration of cellular voice communication and data communication is facilitated by the device of FIG. 1 illustrating a block diagram of the portable communication terminal handset 100 of the present invention. In most respects this portable communication terminal is similar to conventional portable radio telephone handsets in that it includes a radio frequency module 102 having at least one radio frequency transceiver. The radio frequency transceiver uses a main antenna 104 for both receiving and transmitting the various types of signals handled by the portable terminal, such as Advanced Mobile Phone System (AMPS) data (circuit switched cellular data) communication, AMPS voice communication and CDPD communication. A diversity antenna 106 is used as a backup to maintain reception under certain adverse conditions. A telephone type handset 112 is used to facilitate AMPS voice communication.

The portable terminal can also be patched into a local public switch telephone network (PSTN) by way of a digital-analog access interface (DAA) connected to the radio control processor 108. This processor along with control processor and modem 109 divides the various control functions of the portable terminal including call setup, high level protocol, low level protocol, power adjustment, modem operation and data transfer between an external host computer. To facilitate ease of subscriber use, the host computer can be a personal computer (PC) or personal digital assistant (PDA) or other electronic device. The connection hardware of the portable terminal is of a standard type normally used with PC external connectors.

One key difference between the portable terminal of the present invention and conventional cellular handsets and data terminals is the capability of the two processors 108, 109 to control the RF module for communication in both the AMPS mode and the CDPD mode. The RF module 102 is both automatically and manually controlled to operate either in the CDPD mode or the AMPS mode in a manner consistent with the interrelation between the AMPS system and the CDPD system, as indicated in Appendices I and VII.

The CDPD network is designed to operate as an extension of existing data communications networks. A CDPD network shares the transmission facilities of existing analog cellular telephone networks, such as an AMPS network. The CDPD mobile data base station (MDBS) equipment is located at a cellular carrier's cell site and is integrated with existing AMPS base station cellular equipment. CDPD provides a non-intrusive packet-switched data service that shares frequency channels with AMPS networks without impacting on AMPS service. This is done via the end-user subscribers (analogous to the mobile subscribers in a cellular system). The packetized nature of the data transmission from the mobile subscribers allows many CDPD users to share a common channel, accessing the channel only when they have data to send and otherwise leaving it available to other CDPD users. For users whose data transmission requirements are characterized by numerous transmissions of short to medium duration, CDPD is a far more effective mode of communication than circuit switched cellular data modems. CDPD has been adopted as a national standard by the cellular industry and adheres to the standards contained in the publications of Appendix II of this application.

In comparison to AMPS to which the CDPD system is appended, the infrastructure requirements of the CDPD system are very small. The multiple access nature of the system makes it possible to provide substantial CDPD coverage to many users simultaneously with the installation of only one CDPD radio in a given sector. Unlike AMPS, which uses in-band FSK signaling to establish call connections and out-of-band (control channel) signals to control the mobility, CDPD uses a sophisticated set of in-band protocols to control channel access and mobility and to manage the transfer of data throughout the CDPD network. These are discussed in greater detail in Appendix I which also illustrates the relationship between a host AMPS and an appended CDPD network.

Although the CDPD system shares existing AMPS radio frequency channels, AMPS calls are given first priority, and they are always able to preempt the use of any channel being used by CDPD. However, this protocol is not absolute and a cellular service provider may decide to dedicate one or more channels to CDPD use. In such a case, AMPS calls will not preempt the channel(s) occupied by CDPD signaling. In order to assign priority to predetermine type of signal, signal discrimination is necessary. In a mobile data base station (MDBS) employing CDPD, the most common technique includes "RF sniffing" to detect the presence or absence of AMPS activity on any given channel. In some systems, the base station can be given channel information directly by the AMPS equipment via a data interface. If the sniffer finds that a channel is not in use, the MDBS may establish a CDPD network on a particular channel by transmitting on a forward link. The mobile end user will acquire the forward link, register, and then begin to transmit packets on return channels according to a digital sense multiple access (DSMA) scheme in which the mobile end user accesses the channel only when they have data to send. Thus, CDPD network keeps track of the channels in use while the AMPS does not.

The present invention operates to allow the mobile subscriber to receive CDPD communication originated by other parties by providing discrimination between paging signals containing information regarding CDPD communication and paging signals containing information regarding AMPS communication. This discrimination is carried out by a controller including the IC microprocessor chips which maintain the cellular handset or portable data terminal in the CDPD mode until AMPS communication is requested. The power expenditure in this mode is considerably lower than that in the AMPS mode.

In the CDPD mode, a cellular handset operates as a fully functional CDPD mobile terminal. In order to participate in the CDPD network, the handset communicates with a Mobile Data Base Station (MDBS) using GMSK modulation on AMPS radio frequencies and occupying one AMPS channel. According to the present invention, the radio telephone handset will monitor received signal strength. Based upon the detected values, the handset will locate the strongest CDPD channel and register on that channel in the local cell. The handset will also locate and switch to a new CDPD channel whenever the local MDBS switches channels. The CDPD system will support hand-off to an adjacent cell if the portable radio telephone handset travels and receives signal level changes.

By using the CDPD mode as described above, the handset of the present invention has the capability of sending data messages such as electronic mail input by a handset key pad to other users in the CDPD network. The handset can also be used to transport data (via electronic mail/page/FAX/file) to and from the host computer via an appropriate I/O port and the CDPD network. Since the handoff sequence in the CDPD mode mitigates against data loss, as indicated in Appendix VII, successful data transfer can take place even when the mobile data terminal handset is moving from the cell site to another. While in the CDPD mode, the handset is able to conserve battery power by remaining in a dormant or "sleep" protocol when data is not being sent or received.

The data terminal handset will de-register from the CDPD network when another mode is selected either by the user or as established by predetermined protocol. De-registration normally occurs when the user chooses to initiate an AMPS data or voice communication. De-registration also occurs when a paging signal indicative of AMPS communication is received by the portable handset. The user of the handset can also choose to initiate data transmission over the CDPD system even after de-registration has occurred due to AMPS communication. In this case, it is only necessary for the user of the handset to begin communication after the AMPS communication has ended since re-registration would have occurred as soon as the non-CDPD communication had ended.

Figure 2:
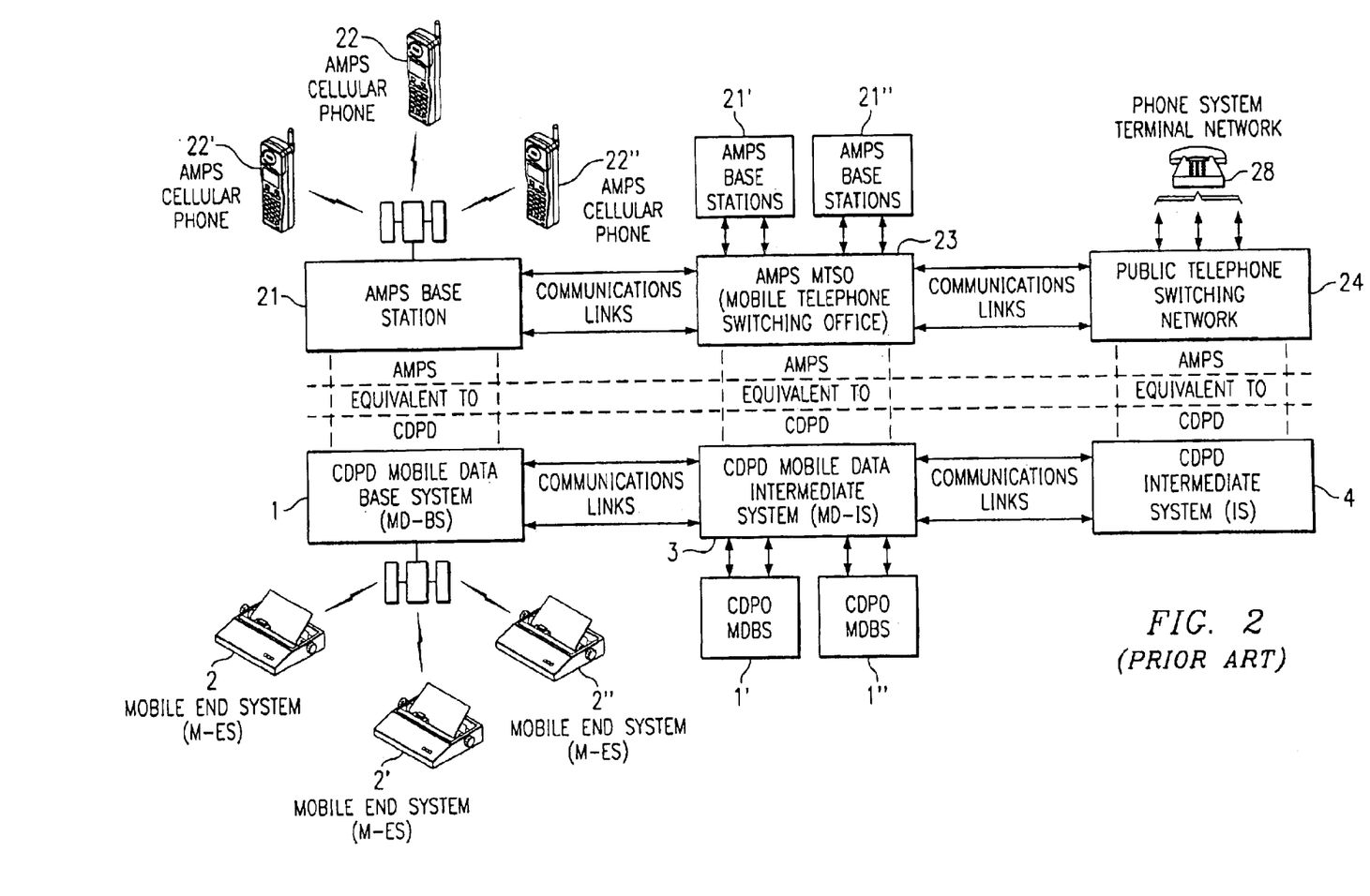
FIG. 2 is a representation of the operating modes available to a radio telephone handset when used in the appropriate communications system.

The portable data terminal handset as configured according to the specifications found at pages 10–12 of Appendix V, permits all the modes of operation illustrated in FIG. 2, for which the handset has capability. Circle 200 in FIG. 2 represents the menu mode selection by either the operator or programmer of the portable data terminal handset. Either of the two modes (AMPS or CDPD) can be selected by an operator using either the key pad on the handset 112 (FIG. 1) or an additional key pad used to import data into the system. If data is being entered into the portable terminal (handset) 100 by a host computer, either the mode or the predetermined default setting can be selected as part of that data transfer.

For best results, the present system is normally in a low-power "sleep" mode as indicated at circle 202. This "sleep" or dormant mode results in the least amount of power expenditure. Normally, the "sleep" mode will be interrupted every 10–255 seconds to check for messages such as incoming paging signals. If none are received, the CDPD mode remains idle as indicated at circle 204. The CDPD can be rendered active as indicated at circle 206 by the receipt of a paging signal, a command from the host computer or the handset user to initiate data transfer in the CDPD mode. The advantage of remaining in the CDPD mode is that the battery is not heavily burdened so that talk time at full transmission power is greater than one hour and standby time while monitoring the AMPS control channel is greater than 12 hours.

All paging is conducted on CDPD channels, but can convey data of an incoming AMPS communication as well as an incoming CDPD communication. If a paging signal indicating an incoming AMPS communication is received, the CDPD mode is interrupted (even if CDPD communication is being conducted at that moment), and one of the two AMPS modes (voice 210 and data 214) is activated. The user or a program from the host computer can select whether an AMPS voice call will preempt AMPS data communication. Depending upon the services the cellular telephone network and its associated land line network will support, different treatment can be given to different incoming calls depending upon the identification of the caller. For example, caller ID, call screening or an automatic call-back can be carried out with the portable data terminal/handset of the present invention.

Normally the handset will remain in the AMPS mode until all AMPS communication has ended. If instructions are not received to remain in the AMPS mode as indicated at circle 212, the handset will return to the dormant mode 202 and carry out the intermittent detection for paging signals in the CDPD mode.

The aforementioned special services such as caller ID and automatic call-back are carried out in the AMPS mode using the FSK control channel including BCH and Manchester encoding, framing, FSK modulation and amplification. FSK reception includes signal recovery (preferably using frequency discrimination), timing recovery, framing recovery, Manchester decoding and BCH decoding. To do this, the handset estimates received signal level, processing audio signals for FM modulation and recovering audio signals after FM demodulation. Audio processing includes the audio filtering, companding, pre-emphasis, deviation limiting, FM modulation, and amplification. The handset also generates SAT and ST signals and combines them with the processed audio signals before the FM modulation period. The receiver portion of the handset includes FM discrimination, de-emphasis, expanding, audio filtering, and amplification. Noise muting is preferably included in receiver processing. The receiver portion also detects an SAT tone and switches to voice mode following detection of a dotting sequence. The handset is capable of recovering data and audio information well in a high noise/high interference environment. The portion of the portable terminal carrying out AMPS communication complies with the standards and specifications enumerated on pages 12–14 of Appendix V. The AMPS mode will also support other communication techniques such as circuit switched cellular communication to effect a cellular modem. Using this technique, the handset of the present invention supports transmission of data and facsimile over the AMPS voice channel using modulation, facsimile, control and data compression standards as listed on page 6 of Appendix V. Using a connection to a public switch telephone network (PSTN), the portable radio telephone handset can support voice, modem and facsimile communication over an associated landline network. The standards for circuit-switched data over the PSTN are found on page 21 of Appendix VI. Modem and facsimile specifications for PSTN operation are found in Appendix III.

Another advantage of the present invention is the use of a common radio module 301 (in FIG. 3) and common processing means, constituted by control processor 302 and Merlin ASIC processing chip 303 for carrying out the functions of both the AMPS and CDPD communication modes. The processor chips 302, 303 are fully described in Appendix IV and divide the control functions of the portable terminal to effect the conversion between the AMPS communication mode and the CDPD communication mode. An application expansion port 304 feeds the data link 305 between the two processor chips 302, 303 in order to allow additional applications to be carried out by the processor chip pair by virtue of additional programmed chips.

Figure 3:
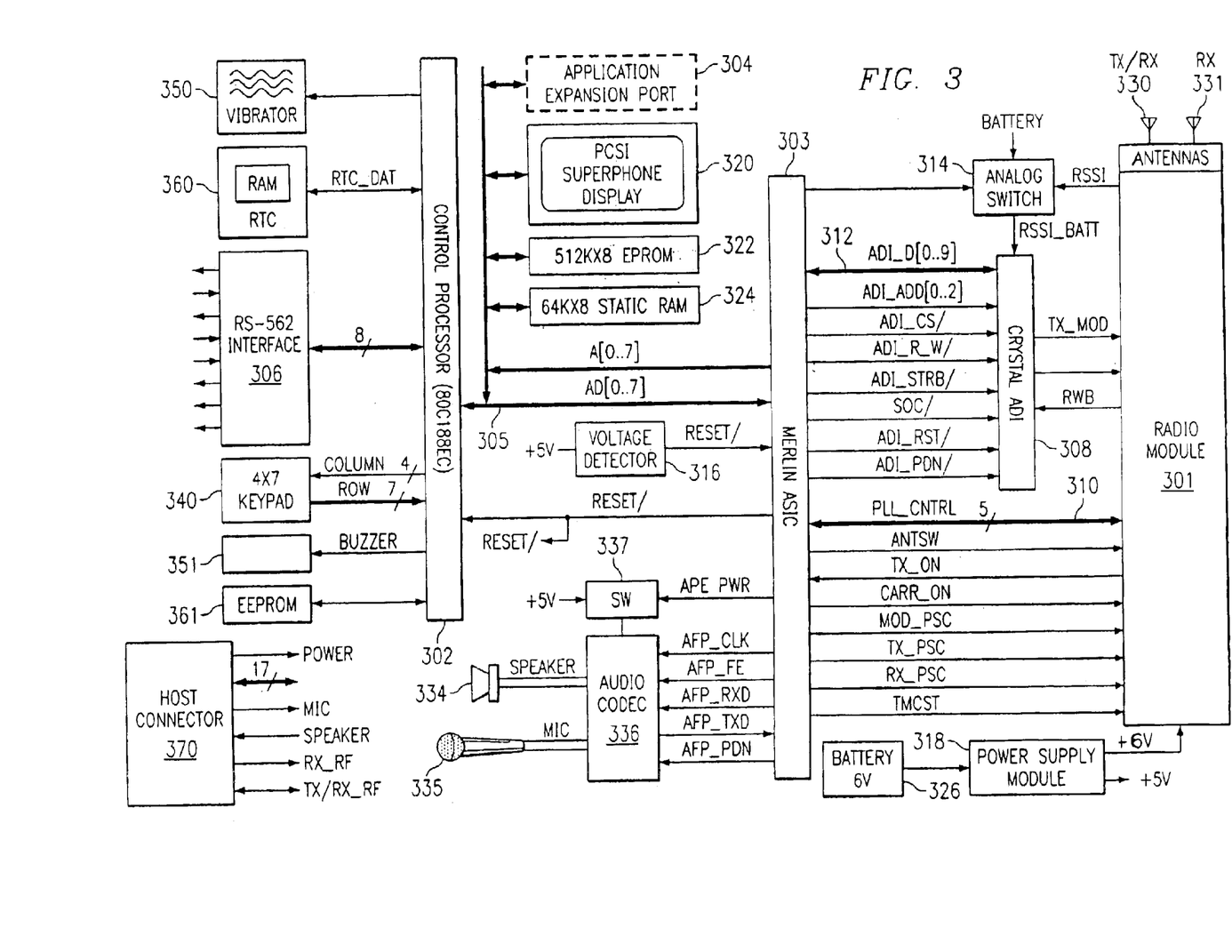
FIG. 3 is a block diagram illustrating discrete hardware components included in the portable radio telephone handset carrying out this present invention.

The two processor chips 302, 303 are also meant to receive data and programming instructions from an external computer through RS-562 interface 306. For ease of operation, this external computer is preferably a personal computer (PC). An internal modem (not shown) can be included as part of the function of the two processor chips 302, 303. Preferably, the computer connected through interface 306 would be a portable device such as a portable digital assistant (PDA) so as to maintain the mobility of the overall data communication terminal handset.

Processor chip 303 controls the phase lock loop of radio module 301 through data line 310. Conversion of analog signals from radio module 301 into digital signals appropriate for processor chip 303 is carried out by analog-digital and digital-analog interface 308. The converted signals are carried between interface 308 and processor chip 303 by way of data trunk 312. In order to carry out the function of signal discrimination and monitor the power supply module 318 for proper power level, a voltage detector. 316 provides an output to processor chip 303.

Power supply module 318 is preferably fed by a six volt battery 326. The power supply module 318 provides a number of different power levels commensurate with the type of operation carried out by the portable data terminal 100.

The overall power drain is most affected by radio module 301 which preferably contains at least one radio frequency transceiver. Normally this transceiver would operate in a frequency range of 824.040–848.970 MHz at a maximum power output of 0.6 watt. Further radio frequency standards are listed on page 11 of Appendix VI, and coincide with the radio frequency standards of the MDBS described in Appendix I and the CDPD system description of Appendix VII. Radio module 301 has a diversity antenna arrangement including transmit/receive antenna 330 and receive antenna 331. This arrangement is used for a switch-over when multipathing occurs in order to maintain the quality of the reception to radio module 301. From the signals received by radio module 301, RSSI (signal strength) data is derived and processed in interface 308 and processor chip 303. The RSSI data is displayed on the handset display 320 at least four times per second when the RSSI signal is routed to the display by means of analog switch 314.

As previously indicated, the control function of the portable data terminal is divided between processor chips 302 and 303. Chip 303 handles the power-down process occurring when the handset goes into the dormant "sleep" mode. Chip 303 also handles lower level protocol for most functions handled by both of the processor chips. Modem communication over an AMPS channel is also controlled by chip 303. Voice communication is effected using speaker 334 and microphone 335 connected to audio codec 336, which in turn is connected to processor chip 303 to receive the appropriate signals for audio communication. Audio codec 336 is activated by switch 337 when appropriate signals are received from processor chip 303.

Processor chip 302 handles call set up as well as high level CDPD protocol. DMA and UART functions are also handled by processor chip 302. Data is input by the user into the system by means of a 4×7 key pad 340. Preferably, all switches of the key pad 340 are a single pull, single throw switches with momentary contact. The key pad is usually provided with backlighting for user convenience.

The user is provided with a "scratch pad" constituted by static ram 324. A control switch 322 constituted by an EPROM is also provided for user convenience. When a paging signal is received by the handset, the user can be advised by means of vibrator 350 or buzzer 351, both connected to processor chip 302. Additional memory capacity can be provided to the coupled processor chips 302, 303 by means of either RAM 360 or EEPROM 361.

Host connector 370 is used to transfer audio frequency and radio frequency signals from the handset to a host cellular terminal such as would be found in an automobile. By placing the handset in an appropriate cradle included with the host terminal, it is possible for the handset to be used in "hands-free" operation if the host terminal supports this function. The pin arrangement of host connector 370 is specified on pages 16–23 of Appendix VI. An additional telephone type handset can be connected to the portable data terminal through host connector 370.

The portable data terminal/handset of the present invention can be arranged in a number of different types of casings and a number of kinds of configurations. For example, the handset can be attached to the casing of portable PC such as a PDA. The two casings can be configured so that the two devices remain portable either separately or attached to each other. In another configuration, the portable/handset can be attached to a non-portable PC, serving as a communications terminal for that PC. In a third configuration, the portable terminal/handset can be used in a stand-alone arrangement, easily carried in a briefcase or about the person of a subscriber. This configuration can also be used with a mobile station in an automobile.

A major advantage of the present invention is that in its use of a CDPD mode for transmitting data, data can be transferred in a substantially uninterrupted manner even when the moving portable terminal/handset moves from one cell site area to another. Although some interruption may take place, normal redundancy protocols supply the data which otherwise would have been lost. Since the CDPD channels support digital data transfer, digital encryption techniques (as referred to in Appendix VII) can be employed to maintain data security. Thus cellular communications can be rendered secure in a way not possible with a normal AMPS system.

As previously described, AMPS paging signals are received on a CDPD channel. Once such signals are received, the AMPS communication mode is entered, and the protocols of AMPS communication control the operation of the handset. However, the present invention need not be limited in this manner. In an additional embodiment of the present invention, the handset remains in the CDPD mode to control AMPS communication. Such control provides certain advantages not readily available in the AMPS mode of communication. These include but are not limited to: (1) an authentication process that is very difficult to intercept; (2) the sleep mode available in CDPD operation; (3) the use of short messaging available in the CDPD mode; and (4) other enhancements such as additional levels of encryption. The control of AMPS communication in the CDPD mode is best understood by viewing the overall CDPD system and its relationship to corresponding AMPS communication systems.

As previously stated, the CDPD communication system shares the same carrier frequencies assigned to the AMPS channel as indicated in Appendix I, and adheres to the standards specified in Appendix VII. An example of a CDPD system servicing a variety of different types of end users is depicted in FIG. 4.

Figure 4:
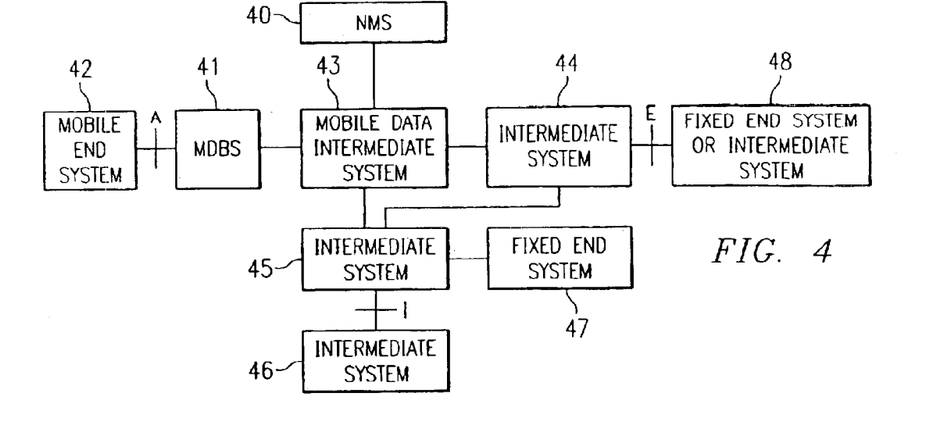
FIG. 4 is a block diagram of a CDPD system.

The base unit, mobile data base station (MDBS 1, as illustrated in FIG. 4), of the preferred CDPD system (MAV) utilize an channel within an AMPS cell to establish a link and communicate to a user's mobile end system. The MDBS may be applicable to other frequencies outside of AMPS that open up to it. The mobile end system (M-ES 42) is a portable computer, handset or other portable electronic device containing a subscriber communication unit. The MDBS serves as a communication link between the user of the M-ES 42 and a service provider's network of wire lines, microwave links, satellite links, AMPS cellular links, or other CDPD links (such as mobile data intermediate system MD-IS 3, intermediate systems 4, 5, 6) to convey data to another mobile end system, computer network, or non-mobile or fixed end-user system (F-ES 7, 8).

The CDPD network is designed to operate as an extension of existing communication networks, such as AMPS networks and the internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually, based on the destination address carried in the packet and knowledge of current network topology. The packetized nature of the data transmissions from a mobile end system 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion of the CDPD network consists of a set of cells. A cell is defined by the geographical boundaries within the RF transmission range from a fixed transmission site such as MDBS 1, which can be received at acceptable levels of signal strength by mobile subscribers such as M-ES 42. The transmitter supporting the cell may be located centrally within the cell, with transmission carried out via an omni-directional antenna, or the transmitter may be located at the edge of a cell and transmitted via a directional antenna. This second type of cell is also referred to as a sector. In typical configurations, the transmitters for several sectors are co-located. The area served by a set of cells have some area overlap, so that a roaming mobile end system can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process is called cell transfer, and is done independently of normal AMPS hand-off procedures.

In FIG. 4, the interface (A) between the mobile end system 2 and the MDBS 1 is an "air interface" constituted by a radio frequency link using standard AMPS frequencies. The MDBS 1 is connected to other mobile data base stations through a mobile data intermediate system (MD-IS) 3. A number of mobile data base stations can be under the control of a single mobile data intermediate system. The mobile data intermediate systems are connected to each other through intermediate systems such as 4 and 5 in FIG. 4.

The intermediate systems are constituted by at least one node connected to more than one sub-network (such as an (MD-IS). The intermediate system has a primary role of forwarding data from one sub-network to another. The mobile data intermediate system 3 performs data packet routing based on knowledge of the current location of each mobile end system within the range of the mobile data base stations under the control of the MD-IS. The MD-IS is the only network entity that is "aware" of the location of any of the mobile end systems. A CDPD-specific Mobile Network Location Protocol (MNLP) is operated between each MD-IS (through the intermediate system) to exchange location information regarding the mobile end systems.

The overall CDPD network is controlled by a network management system (NMS) 10 having an interface with at least one mobile data intermediate system 3. Using a special protocol, programming instructions can be transmitted from the NMS 10 through the MD-IS 3 to any number of mobile data base stations under the proper conditions.

Such programming instructions can be used to convey useful network data to the MDBS, as well as configuring the operation of an MDBS with respect to such critical features as maintaining channel queues. The NMS also controls other CDPD system characteristics such as the timing of paging messages to coincide with the non-dormant periods of the M-ES hand-sets. One advantage of the present invention is the capability of providing operating instructions to mobile data base stations from the NMS 10 through an MD-IS 3, or by a direct connection to the MDBS as is outlined in the detailed description of the MDBS architecture. The functions and protocol as carried out by each of the mobile end systems and the mobile data base station are explained in greater detail later herein.

Figure 5:
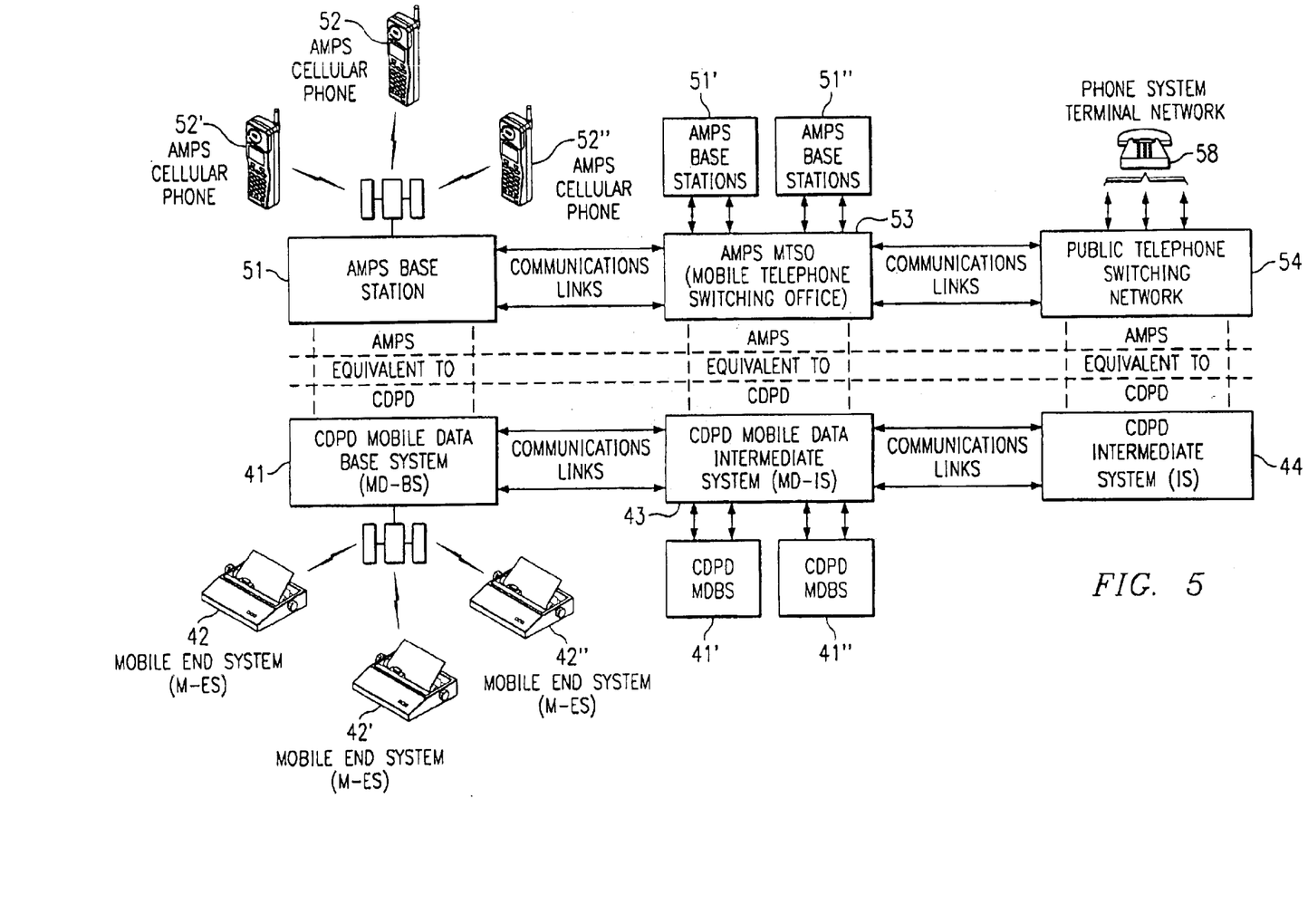
FIG. 5 is a block diagram of a CDPD system related to an accompanying AMPS system.

FIG. 5 provides a comparison between the CDPD network illustrated in FIG. 4 and the standard AMPS network. The MDBS 1 is the CDPD equivalent to an AMPS base station 21. Both serve as links to mobile users, 2, 2', and 2" for the CDPD system and 22, 22' and 22" for AMPS users. As previously indicated in U.S. patent application Ser. No. 08/117,913, filed Sep. 8, 1993, both AMPS and CDPD functions are preferably handled by the same hand-set or end system equipment. Also, the MDBS 1 is preferably located with the AMPS base station 21 as be will explained in greater detail later.

The mobile data intermediate system 3 which acts as a local controller for the mobile data base stations connected thereto is equivalent to the mobile telephone switching office (MTSO) 23 used to control a plurality of AMPS base stations 21, 21' and 21". In the AMPS system, the MTSO 23 can be connected to the various base stations 21, 21', 21" by way of communication links, either over dedicated landlines or through a public switched telephone network (PSTN). Likewise, the connection between MD-IS 3 and the various mobile data base stations 1, 1', 1" controlled thereby is made in the same manner. However, different signaling protocols are used than those found in the AMPS system.

In comparison to AMPS, the infra-structure requirements of CDPD are very small. The CDPD base station equipment is located (preferably) at a cellular carrier's cell site along side existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF links if both are co-located. (In contrast, the MTSO of the AMPS system and the MD-IS of the CDPD system do not have to be co-located in order to share RF links.) In the AMPS system, the MTSO 23 has the responsibility of connecting the AMPS base station and the mobile station to another party 28 through a public switched telephone network 24 (PSTN). The intermediate system 4 of the CDPD corresponds to the use of the PSTN by the AMPS system. Like the AMPS system, the CDPD system must also use the public switch telephone network or another landline network for completing calls to remote parties or systems such as 28. However, the CDPD system employs a different protocol than that used by the AMPS system for completing calls over a PSTN.

In general, the CDPD system illustrated in FIG. 4 operates to provide service to manage data communications to subscribers over a wide geographic range. When a mobile end system is located in its home area, data packets are routed directly to and from it by the home MD-IS via the home MDBS. The route via which data packets are forwarded to and from a mobile end system changes when the mobile end system roams out of its home area.

The CDPD system operates to provide a mobile home function (MHF), including a fixed reference location for each M-ES, where each M-ES is associated with a specific MDBS which is located in a fixed home area, and which keeps track of the location of the M-ES when it roams out of its home area. The MHF consists of two services: location directory service, maintaining an information base of the current serving area for each of the M-ES listed in the system; and a redirection and forwarding service, operating in a forward direction (from caller to mobile subscriber) only. The packeting forwarding service of the mobile home function routes packets destined for a roaming M-ES. In the forward direction (packets destined for an M-ES), packets are routed first to the MD-IS in the home area, then encapsulated and tunneled to the MD-IS in the current serving area. The packets are then routed to the called M-ES at its current cell location through the MDBS serving that cell. In the reverse direction (originating from an M-ES), packets are routed directly to their destination. There is no requirement for packets traveling in the reverse direction to carry the home MD-IS identification.

The MDBS maintains zero or more (up to the MDBS transmission capability) channel streams across the airlink interface, as directed by the MD-IS controlling that MDBS. The MDBS instructs all subscriber units to change channels when necessary such as when an AMPS communication is detected on the CDPD channel. Each subscriber unit's terminal stream is carried on one channel stream at a time, normally selected by the mobile subscriber, preferably based upon data received from the MDBS regarding optimum channels for CDPD use. The forward and reverse traffic in a given cell (its terminal stream) is carried on a single DS0 trunk, between the MDBS and the MD-IS. The communication between the MDBS and the MD-IS over the DS0 trunk follows standard formats such as T1.

Within the CDPD network, digital data is burst mode transmitted between a given subscriber unit (SU) within a mobile system and a mobile data base station (MDBS) using Gaussian Minimum Shift Keying (GMSK) modulation. Communicating in a burst mode fashion reduces the time that an SU communicates with an MDBS such that other SUB can talk with the same MDBS. For a given data size, the CDPD connect time is reduced considerably when compared to sending digital data over the AMPS network. Presently the raw (baseband) digital data envisioned being transferred across CDPD are electronic mail messages, digital fax data, or digital data representing a network connection such that files may be transferred as if currently connected to a local area network. Other CDPD applications are being developed such as CDPD duplex paging.

The MD-IS handles the routing of packets for all visiting mobile end systems in its serving area. When a M-ES registers for network access in an MD-IS serving area, the home MD-IS is notified of the current location of the subject M-ES. Two services are performed by the MD-IS: a registration service maintaining an information base of each M-ES currently registered in a particular serving location; and a re-address service, decapsulating forwarded packets and routing them to the correct cell. The serving MD-IS also administers authentication, authorization and accounting services for the network support service applications.

Within a cell area the MDBS first performs "RF sniffing" in order to detect an unused AMPS channel. CDPD use of an AMPS channel is limited to the idle time between AMPS channel access. If an AMPS cellular unit begins transmitting on a channel occupied by CDPD, the CDPD unit ceases transmitting on that channel and waits until the same channel becomes available or switches, referred to as channel hopping, to a different available channel.

Although the CDPD system shares existing AMPS radio frequency channels, as stated above, AMPS calls are given first priority, and they are always able to pre-empt the use of any channel being used by CDPD. However, the cellular service provider may opt to dedicate a channel or channels to CDPD usage. In this case, AMPS calls will never attempt to pre-empt the channels dedicated to CDPD use. It is noted that the use of such dedicated channels undermines optimum usage of AMPS systems in that the dedicated channels are no longer available for AMPS usage.

Normally, the MDBS functions to monitor activity on AMPS channels. Based upon this activity, a list or a series of list will be maintained at the MDBS to indicate those channels least likely to be used by the AMPS system and thus, most beneficial for possible CDPD use. This information is passed to each M-ES within range of that base station. Thus, each M-ES is provided with information as to which channel (out of all of those designated for CDPD use by the MDBS) will be selected in case the present CDPD channel is preempted by AMPS communication, as well as the most likely candidates for future channel hopping.

One aspect of normal CDPD systems is that CDPD communication is interrupted upon detection of an AMPS communication on the CDPD channel. Such interruption entails the loss of data with the consequent requirement that the lost data be retransmitted when another CDPD communication can be arranged via the MDBS. Also, once CDPD communication is pre-empted, the mobile subscriber must hunt for another channel available for CDPD communication, creating further delay. The situation can be avoided if AMPS usage can be predicted and channel hopping arranged to periodically select channels for optimal CDPD usage, and carrying out the channel hopping between data transmissions.

The base station described infra. is configured to carry out the aforementioned functions in the most efficient manner practical. The base station monitors all AMPS communications, derives a list (queue) of channels most likely to be selected for AMPS usage, and then derives a second list of channels most likely to be good candidates for CDPD usage based upon AMPS usage. This data is transmitted to each of the mobile end systems within the sector of the MDBS. Predicted channel hops are determined by the MDBS, and the channel to hop to is broadcast in a "switch channels message" to the subscriber units. A properly programmed subscriber unit will stop transmitting after getting a "switch channels message" and retransmit the data after acquiring the new channel. The mobile subscribers use the channel data broadcast from the MDBS to guide them in their search for a new channel after the channel hop has occurred. More particular procedures for deriving lists for optimum CDPD use are explained in greater detail, infra.

The characteristics of the aforementioned handset and local data base stations facilitate additional features on a system wide basis. In particular, the characteristics of the handset and MDBS permit a new relationship between CDPD systems and corresponding AMPS systems. This new relationship is illustrated in FIG. 6.

Figure 6:
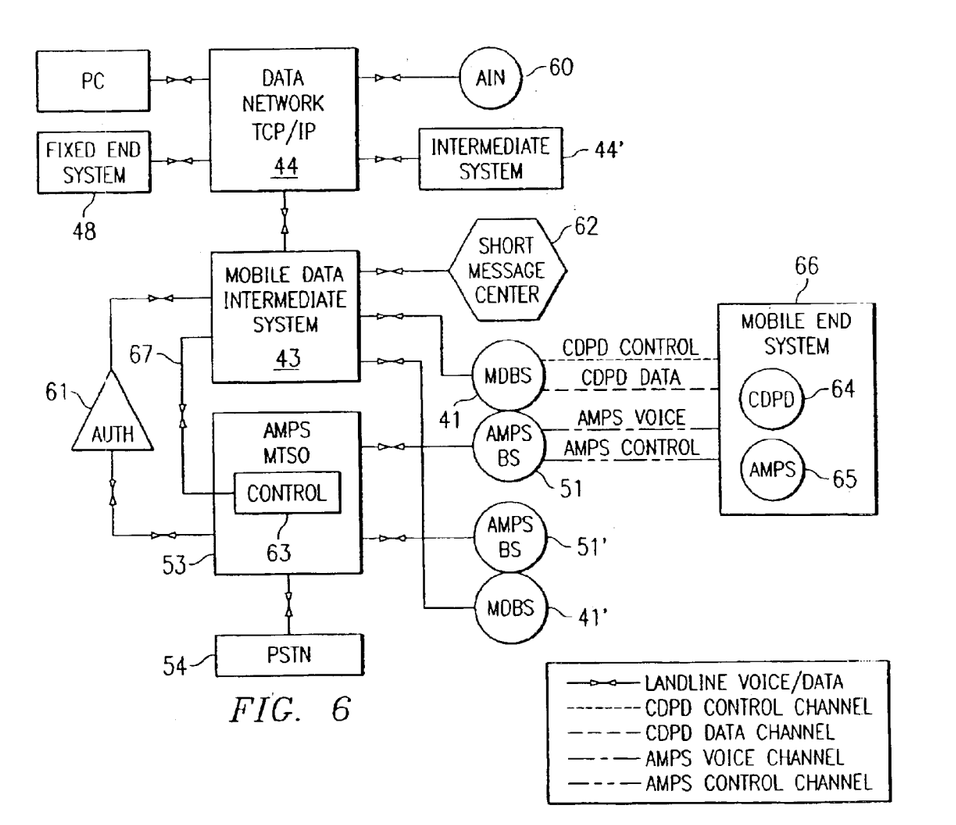
FIG. 6 is a block diagram depicting an expanded relationship between a CDPD system and an AMPS system.

FIG. 6 includes elements having drawing designations in accordance with FIGS. 4 and 5, and can be considered an elaboration upon the systems depicted in those two drawings. The arrangement of FIG. 6 is essentially the same as that in FIGS. 4 and 5 with certain additions facilitated by the characteristics of the handset and the mobile data base station in conjunction with other mobile data intermediate system 43, which is the CDPD equivalent of the AMPS mobile telephone switching office 53. Normally, the MD-IS 43 is isolated from AMPS MTSO 53 even though the two can be co-located. In the conventional art, AMPS control and CDPD control are separate functions even if circuitry in the handset 42 can handle both.

However, in the system of the present invention, MD-IS 43 is linked to control portion 63 of MTSO 53 via a data link 67. Like most data links, 67 is constituted by a landline data link. This link in conjunction with the proper programming of the processors in the MD-IS 43 and MTSO 53 permit control functions to be exchanged between MD-IS 43 and MTSO 53. This exchange can include the substitution of the control functions of MD-IS 43 for those of MTSO 53.

It is noted that MD-IS 43 and MTSO 53 are connected to authorization platform 61 via data links. Authorization platforms are well known and would be used to verify PIN numbers or decode encrypted messages. However, with link 67, the data links authorization platform 61 from both MD-IS 43 and MTSO 53 are no longer necessary. Only one would require data link authorization platform 61 since the necessary verification data from the authorization platform would be shared with the other via data link 67.

A data link also exists within mobile end station 42. This is a software link 66 depicted between CDPD functional portion 64 and AMPS functional portion 65. As previously explained, these functional portions are not separate circuits but rather programming used by both processors in the handset depicted in FIGS. 1 and 3. Software link 66 allows the substitution of one control function for another. For example, CDPD control can be substituted for AMPS control, using CDPD control channels to carry out the AMPS control functions. Thus, in conjunction with software changes and data line between MD-IS 43 and MTSO 53, set up and control of AMPS communication can be conducted with a properly programmed handset 42.

In a normal operation, when a handset is activated, it immediately scans for control channels to conduct registration on a particular communication system. This is true both for AMPS and CDPD systems. Consequently, handset 42 will carry out two registration operations upon activation. The first is a scanning for an AMPS control channel so that the handset can be assigned an AMPS voice channel. The second operation is a scanning for a CDPD control channel to facilitate assignment of a CDPD data channel once registration is carried out. Thus, a registration takes place with both mobile data base station 41 and AMPS base station 51. These registration operations are independent of each other as is the circuitry of MDBS 41 and AMPS 51, even though the two base stations may be co-located with each other. This redundant operation imposes a burden upon handset 42 complicating the overall process. Further, AMPS registration takes place over non-protected radio links, exchanging all the necessary identification data that is proprietary to a particular handset. Recently, it has become a common practice to intercept the AMPS identification data during the registration, and use that data to program another handset thereby charging the air time to the original subscriber whose registration transmission was intercepted. This legal practice has become so widespread as to undermine confidence in cellular telephone systems.

A simple and elegant solution to the aforementioned problem is to use one registration on a CDPD control. Such channels are encrypted. Thus, illegal interception of the registration message provides no useful data to the potential thief. The handset 42, base stations 41, 51 and switching offices 43, 53 can be programmed for the necessary protocol to include the AMPS registration data along with the CDPD registration message. The CDPD control of the AMPS communication of the present invention is preferably limited to those steps in which critical identification information regarding the handset 42 would normally be exchanged with the AMPS base station 51. However, there is no reason that complete set-up of an AMPS call, including hand-off and de-registration upon conclusion of the call cannot be performed using the CDPD control channels. The only drawback would be that extensive AMPS communication could over-burden the CDPD control channels. Consequently, there would be the need for an algorithm to balance the amount of AMPS control that was carried out on the CDPD control channels. One solution would be the allocation for CDPD use of channels normally allocated to AMPS.

The simplest way of carrying out this technique is to program handset 42 to delete the scanning for an AMPS control channel and to provide AMPS data with the CDPD registration. This information would be sent to mobile data base station 41 via CDPD control channel, and from there to MD-IS 43. Additional programming of the MD-IS to provide a protocol to separate the AMPS data from the CDPD data. Such protocols are well known to those skilled in the art of data communication, and thus, would require very little effort to carry out the necessary reprogramming. The AMPS data is sent over data link 67 to the AMPS MTSO 53 controller 63. The MTSO 53 would then allocate a voice channel for AMPS communication for handset 42. This channel assignment could be sent via AMPS base station 51 over an AMPS control channel, or the channel assignment data could be sent back over data link 67 through MD-IS 43, and to MDBS 41 for transmission over the CDPD control channel. The exact point at which full communication for AMPS would take place solely between the AMPS base station and handset 42 would be left up to the communication system operator. The key to this technique is that non-encrypted AMPS communication not contain critical handset identity information. Rather, all such communication including such data should be conducted over the encrypted CDPD control channel.

MD-IS 43 can be further programmed for additional levels of encryption in a manner already well known in the data transmission art. In the alternative, MD-IS 43 can rely upon intelligent peripherals or authorization systems such as authorization platform 61 to provide additional levels of security using higher order encryption techniques. These are also techniques already well known in the data communication art.

Short message center 62 is linked to MD-IS 43. The use of message center 62 allows short messages to be retained within the CDPD system during the CDPD sleep mode. When the handset periodically comes out of the sleep mode to check for message, an indication will be sent from the base station that a short message can be downloaded to the handset.

MD-IS 43 is also connected to data network 44 using TCP/IP protocol. This data network can be connected to other data networks which is IS 44' or to fixed end users such as F-ES 48. The data network can also be accessed using a personal computer 68. The protocols covering such data transfers are all well known in this art. In addition, data network 44 can interface with common Channel Interoffice Signaling System (CCIS) of an Advanced Intelligent Network (AIN) 60 for a landline telephone system. A description of such systems is found in U.S. Pat. No. 5,247,571 to Kay et al., incorporated herein by reference. Data network 44 and the CCIS of the AIN use different protocols. However, communication between two such systems can be carried out by translating protocols, and reaching an administrative agreement between carriers. An arrangement whereby the MD-IS is connected to the AIN through data network 44 would result in additional calling features available on the AIN being applicable to the MD-IS with the proper protocol translations. Further, communication carried out by the AIN with additional entities such as credit authorization systems would also be available to the MD-IS. Since the MD-IS contains a data link 67 with AMPS MTSO 53, all such data could then be available to the AMPS system associated with the CDPD system.

The CDPD system has the capability of easily interfacing with existing AMPS systems and sharing some front-end equipment with the existing AMPS system. To take advantage of this capability the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside of the MDBS which is normally shared with the AMPS system. Thus, the MDBS must be easily connectable to the following pieces of external equipment found in the AMPS base station: an antenna system; RF power amplifiers (in particular, linear amplifiers can be shared with existing AMPS), RF multi-couplers; power splitters; duplexers; and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

The same conditions can apply to the co-location of the MD-IS and the MTSO controlling AMPS communication. While co-location of the MD-IS and the MTSO is not necessary for the operation of the present invention, such co-location can be very beneficial by reducing the length of data links.

Although a number of arrangements of the present invention have been mentioned by way of example, it is not intended that the invention be limited thereto. For example, the present invention can be adapted with the appropriate use of its expansion ports and connection to systems having the appropriate characteristics to support electronic mail, a modem emulation mode, TCP—IP connections, call screening, automatic paging acknowledgement including messaging, and location functions. Accordingly, this invention should be considered to include any and all configurations, modifications, variations, combinations or equivalent arrangements following within the scope of the following claims.

What is claimed is:

1. A data/voice communication system including analog cellular Advanced Mobile Phone Service (AMPS) portion and a Cellular Digital Packet Data (CDPD) portion, each said portion constituted by a plurality of base stations configured to carry out communications with a plurality of portable radio telephone devices, said base stations being controlled by respective switching offices for said AMPS and said CDPD systems, said switching offices being connected to external communication networks, said improvement comprising:

(a) means for exchanging AMPS registration data between a CDPD base station and one of said mobile radio telephone stations over a CDPD control channel.

2. The data/voice communication system of claim 2, further comprising:

(b) means for conveying AMPS corresponding to a predetermined portable radio telephone station from said CDPD portion to said AMPS portion.

3. The data/voice communication system of claim 2, wherein said means for conveying comprise at least one data link between at least one CDPD switching office and at least one AMPS switching office.

4. The data/voice communication system of claim 3, wherein one of said external communication networks connected to one of said CDPD switching offices comprise a data network.

5. The data/voice communication system of claim 4, wherein said data network is operated according TCP/IP protocol.

6. The data/voice communication system of claim 5, further comprising a connection between said data network and a landline Advanced Intelligent Network (AIN).

7. The data/voice communication system of claim 2, wherein all data conveyed on such CDPD control channel is encrypted.

8. The data/voice communication system of claim 7, wherein said CDPD portion further comprises means for applying additional encryption to data conveyed via said CDPD control channel.

* * * * *

UNITED STATES PATENT AND TRADEMARK OFFICE
CERTIFICATE OF CORRECTION

PATENT NO. : 6,876,863 B1
DATED : April 5, 2005
INVENTOR(S) : Martin K. Schroeder, Yorgos M. Peponides and Michael L. Lubin It is certified that error appears in the above-identified patent and that said Letters Patent is hereby corrected as shown below:

Column 4,
Line 26, "80" should be -- so --;

Column 14,
Line 14, "SUB" should be -- SUs --;

Column 18,
Line 34, "claim 2" should read -- claim 1 --.

Signed and Sealed this

Sixth Day of September, 2005

JON W. DUDAS
*Director of the United States Patent and Trademark Office*